United States Patent
Magalingam Adithyan et al.

(10) Patent No.: US 12,372,113 B2
(45) Date of Patent: Jul. 29, 2025

(54) HYDRODYNAMIC BEARING ARRANGEMENT FOR PUMP ASSEMBLY

(71) Applicant: Schaeffler Technologies AG & Co. KG, Herzogenaurach (DE)

(72) Inventors: Arjun Kailassh Magalingam Adithyan, Charlotte, NC (US); James Brown, Rock Hill, SC (US); Charles Schwab, Fort Mill, SC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 249 days.

(21) Appl. No.: 17/958,674

(22) Filed: Oct. 3, 2022

(65) Prior Publication Data
US 2024/0110593 A1   Apr. 4, 2024

(51) Int. Cl.
*F16C 17/10* (2006.01)
*F16C 17/04* (2006.01)
*F16C 33/10* (2006.01)

(52) U.S. Cl.
CPC .......... *F16C 17/107* (2013.01); *F16C 17/047* (2013.01); *F16C 33/1075* (2013.01); *F16C 2360/44* (2013.01); *F16C 2361/61* (2013.01)

(58) Field of Classification Search
CPC .... F16C 17/028; F16C 17/047; F16C 17/102; F16C 17/107; F16C 33/107; F16C 33/1075; F16C 2360/44; F16C 2361/61; F16H 57/0469; F16H 57/0471; F16H 57/0479; F16H 2057/085
See application file for complete search history.

(56) References Cited

U.S. PATENT DOCUMENTS

| | | | | |
|---|---|---|---|---|
| 3,293,931 A | * | 12/1966 | Beattie | F16C 17/047 74/325 |
| 9,228,653 B2 | * | 1/2016 | Botez | F16H 57/043 |
| 10,145,411 B2 | * | 12/2018 | Sundararaman | F16C 33/1065 |
| 11,111,958 B1 | | 9/2021 | Tate et al. | |
| 2015/0337949 A1 | * | 11/2015 | Ziegler | F16H 57/0471 475/159 |
| 2020/0224665 A1 | * | 7/2020 | Jaenike | F04D 29/056 |
| 2021/0277938 A1 | * | 9/2021 | Tate | F16C 17/105 |
| 2022/0048374 A1 | | 2/2022 | Magalingam Adithyan et al. | |

FOREIGN PATENT DOCUMENTS

| | | | | |
|---|---|---|---|---|
| EP | 3536993 A1 | * | 9/2019 | ............. F16C 17/10 |
| JP | H11170397 A | * | 6/1999 | |
| WO | WO-2018059984 A1 | * | 4/2018 | |

OTHER PUBLICATIONS

Machine Translation of JPH11-170397 (Year: 1999).*
Machine Translation of EP 3536993 (Year: 2019).*
Machine Translation of WO 2018059984 (Year: 2018).*

* cited by examiner

*Primary Examiner* — Alan B Waits
(74) *Attorney, Agent, or Firm* — Volpe Koenig

(57) ABSTRACT

A bearing configuration for an oil pump assembly is disclosed herein. The bearing configuration includes a first radially extending hydrodynamic bearing element configured to directly face a first axial side of a gear, a second radially extending hydrodynamic bearing element configured to directly face a second axial side of the gear, and an axially extending hydrodynamic bearing element configured to directly face a radially inner side of the gear. The bearing configuration is configured to be used to support an idler gear in a transmission assembly, in one example.

10 Claims, 8 Drawing Sheets

HYDRODYNAMIC BEARING ARRANGEMENT FOR PUMP ASSEMBLY

FIELD OF INVENTION

The present disclosure relates to a hydrodynamic bearing and is more particularly related to a hydrodynamic bearing arrangement in an oil pump assembly.

BACKGROUND

Oil pump assemblies within transmissions are well known. In these known oil pump configurations, a gear, such as an idler gear, can be mounted to engage with a drive gear and a driven gear. Support for this idler gear can be provided radially via a ball bearing or deep groove bearing. Axial faces of the idler gear can be configured to face a support (i.e., front support) and a cover (i.e., housing cover), which can be fixed to the support.

FIG. 1 illustrates one configuration for a portion of a transmission assembly 101 in which a gear 102 (i.e., idler gear) is arranged between a drive gear 103 and a driven gear 104. A cover 105 is provided on a first axial side of the gear 102 and a support 106 is provided on a second axial side of the gear 102. A support bearing 107 is also provided for the gear 102. In these known configurations, traditional bearings, such as ball bearings and deep groove bearings, can experience vibrational issues and are prone to failure due to contact ellipse truncation due to excessive titling and misalignment as the gear 102 undergoes tilting.

It would be desirable to provide an improved support or bearing configuration for the gear in this configuration.

SUMMARY

An improved hydrodynamic bearing configuration for a gear is disclosed herein. In one example, the gear that is being supported is an idler gear. The bearing configuration can include a first radially extending hydrodynamic bearing element configured to directly face a first axial side of a gear, a second radially extending hydrodynamic bearing element configured to directly face a second axial side of the gear. In one example, the configuration further comprises an axially extending hydrodynamic bearing element configured to directly face a radially inner side of the gear. In another example, a bearing assembly can be provided radially inward from the gear.

The first radially extending hydrodynamic bearing element can be configured to be fixed to a support. The second radially extending hydrodynamic bearing element can be configured to be fixed to a cover via a connection. The connection between the second radially extending hydrodynamic bearing element and the cover can be formed via a protrusion on the second radially extending hydrodynamic bearing element mating with a receptacle on the cover.

The second radially extending hydrodynamic bearing element can be formed integrally with a cover, in one example. The first radially extending hydrodynamic bearing element and the axially extending hydrodynamic bearing element can be formed integrally with each other, in one example. In another example, these elements can be formed separately from each other.

The axially extending hydrodynamic bearing element can be configured to be press fit onto a radially outer surface of a support.

A clearance (C1) can be configured to be provided between the first radially extending hydrodynamic bearing element and the gear, and the clearance (C1) can be 50 microns-100 microns.

A clearance (C2) can be configured to be provided between the second radially extending hydrodynamic bearing element and the gear, and the clearance (C2) can be 50 microns-100 microns.

A clearance (C3) can be configured to be provided between the axially extending hydrodynamic bearing element and the gear, and the clearance (C3) can be 50 microns-150 microns.

The first radially extending hydrodynamic bearing element can define a first axial bearing surface configured to face a first axial side of the gear. The second radially extending hydrodynamic bearing element can define a second axial bearing surface configured to face a second axial side of the gear. The third axially extending hydrodynamic bearing element can define a radial bearing surface configured to face a radially inner surface of the gear. The hydrodynamic bearing can include a bearing surface on at least one of a radial bearing surface or an axial bearing surface having a profile comprising a flat section with ramped sections on either end of the flat section, and groove sections on respective ends of the ramped sections.

Additional embodiments are disclosed herein.

BRIEF DESCRIPTION OF THE DRAWINGS

The foregoing Summary and the following Detailed Description will be better understood when read in conjunction with the appended drawings, which illustrate a preferred embodiment of the disclosure. In the drawings.

DETAILED DESCRIPTION OF THE PREFERRED EMBODIMENTS

Certain terminology is used in the following description for convenience only and is not limiting. "Axially" refers to a direction along an axis (X) of an assembly. "Radially" refers to a direction inward and outward from the axis (X) of the assembly.

A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

A hydrodynamic bearing configuration is disclosed herein. In one embodiment, the hydrodynamic bearing configuration can be used in an oil pump assembly setting, and more specifically can be used in a transmission assembly. The hydrodynamic bearing configuration is generally configured to provide at least one hydrodynamic bearing interface or feature that faces a gear of the oil pump assembly. More specifically, the gear can be an idler gear, which is generally arranged between a drive gear and a driven gear. The specific configuration for the idler gear can vary, as one of ordinary skill in the art would appreciate from this disclosure.

Figure 1:
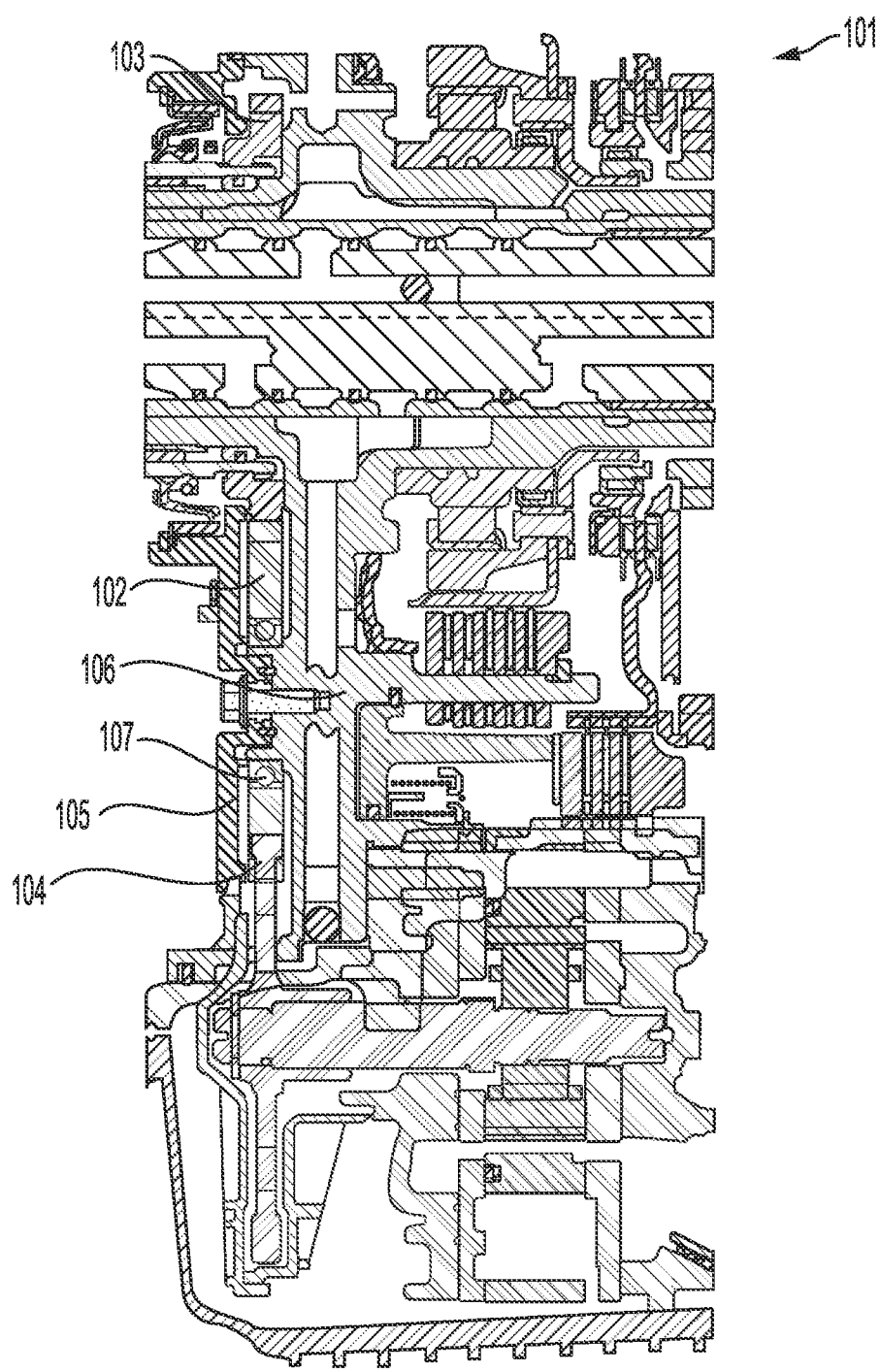
FIG. 1 is a cross-sectional view of a portion of a transmission assembly according to one embodiment.
Figure 2A:
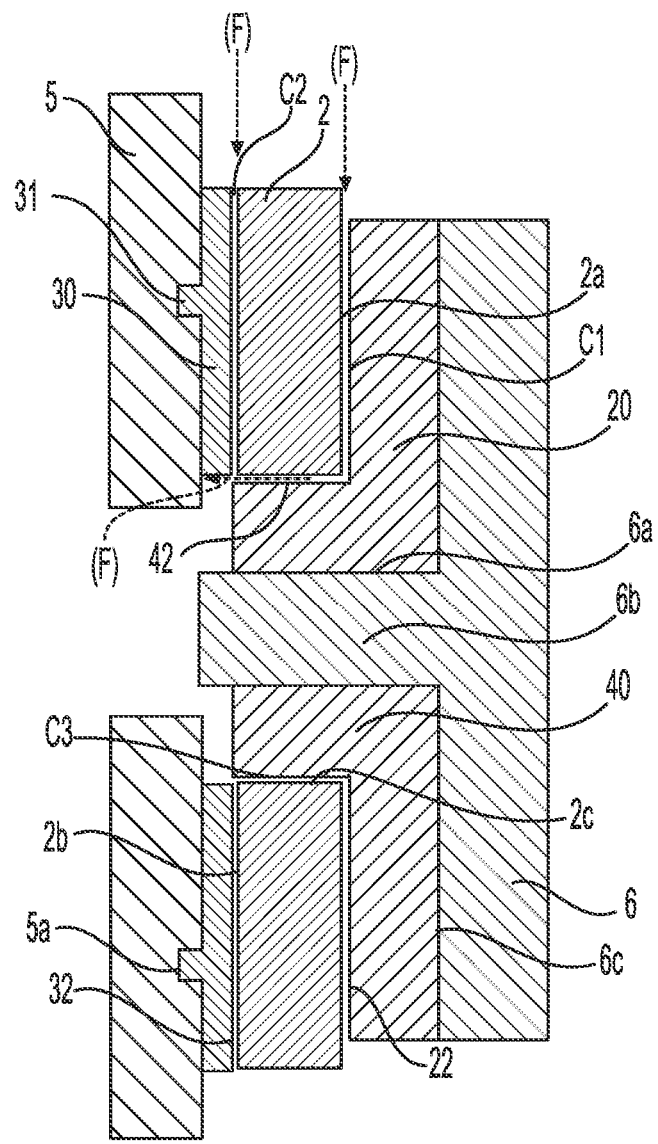
FIG. 2A is a cross-sectional schematic view of a hydrodynamic bearing assembly according to one embodiment.

The bearing configuration can provide hydrodynamic bearing interfaces or features on at least two sides of the idler gear, and more specifically can be configured to provide hydrodynamic bearing interfaces or features on three sides of the idler gear. In one example, both axial sides and a radially inner side of the idler gear can be configured to face the bearing configuration. FIG. 2A illustrates one exemplary fluid path (F) for oil or hydraulic fluid being fed to the bearing interfaces. Fluid can be distributed based on the relative motion of gears within the bearing configuration and can be fed radially inward during an initial state, and then axially outward during a subsequent state.

As used herein, the bearing configuration is described as including various elements, but one of ordinary skill in the art would understand that any one or more of the elements can be formed integrally with each other.

Referring to FIG. 2A, a first radially extending hydrodynamic bearing element 20 is provided that is configured to directly face a first axial side 2a of the gear 2. A second radially extending hydrodynamic bearing element 30 is provided that is configured to directly face a second axial side 2b of the gear 2. An axially extending hydrodynamic bearing element 40 is provided that is configured to directly face a radially inner side 2c of the gear 2.

One of ordinary skill in the art would understand that the thickness, shape and profile of the hydrodynamic bearing elements 20, 30, 40 can vary depending on the space available.

The first radially extending hydrodynamic bearing element 20 can be configured to be fixed to a support 6, such as a front support element. In one example, the first radially extending hydrodynamic bearing element 20 is formed integrally with the axially extending hydrodynamic bearing element 40 and the axially extending hydrodynamic bearing element 40 is fixed to the support 6 via a press fit. This configuration is shown in FIG. 2A. The support 6 can include an axial portion 6b that defines a radially outer surface 6a that engages with a radially inner surface of the axially extending hydrodynamic bearing element 40. A radial portion 6c of the support 6 can define an abutment surface for at least a portion of the first radially extending hydrodynamic bearing element 20 and the axially extending hydrodynamic bearing element 40. The axially extending hydrodynamic bearing element 40 can be arranged radially between the axial portion 6b of the support 6 and the radially inner side 2c of the gear 2.

Figure 2B:
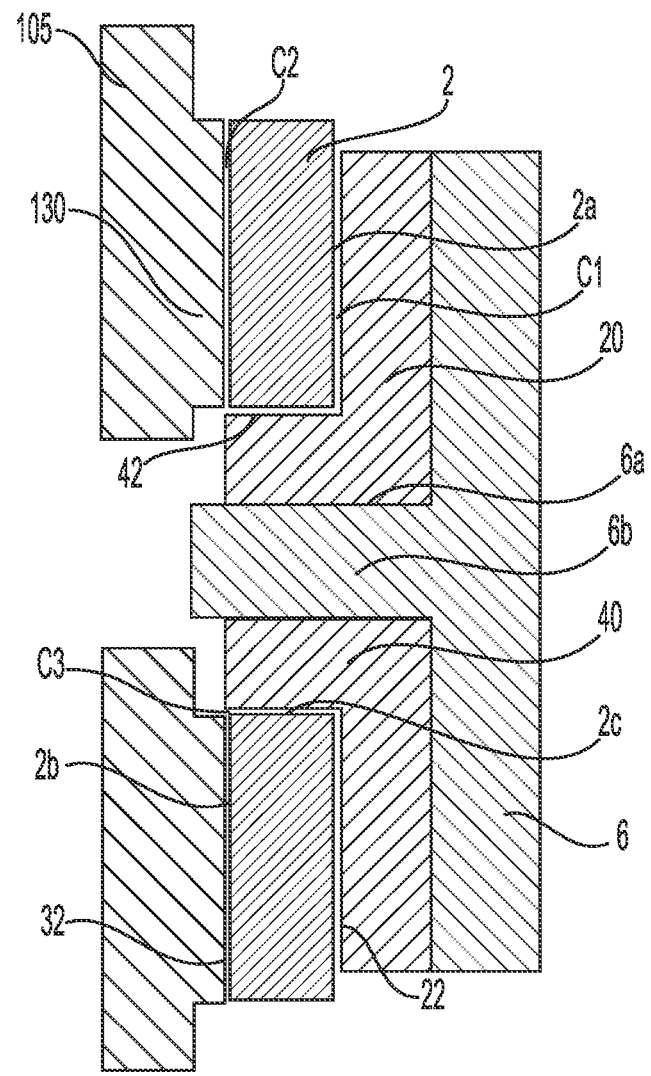
FIG. 2B is a cross-sectional schematic view of a hydrodynamic bearing assembly according to one embodiment.
Figure 3B:
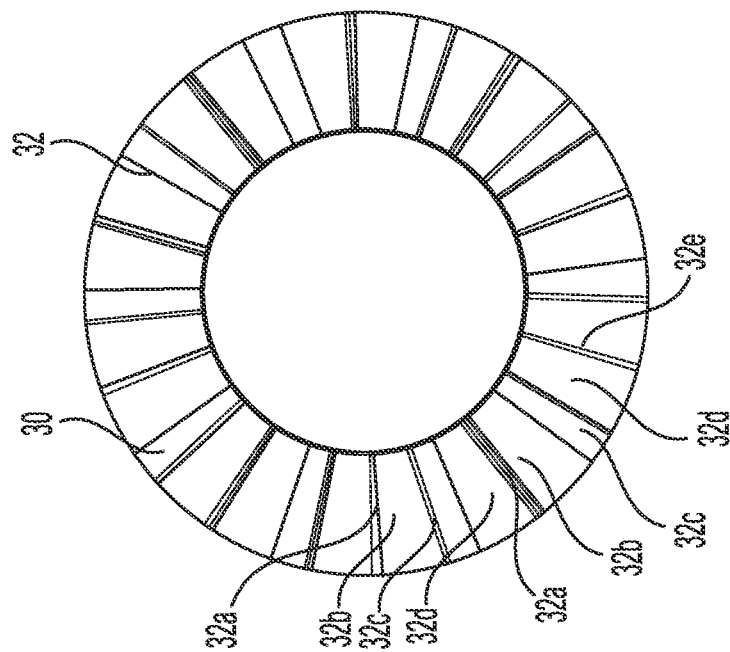
FIG. 3B is a front view of the axial hydrodynamic bearing component of FIG. 3A.
Figure 3A:
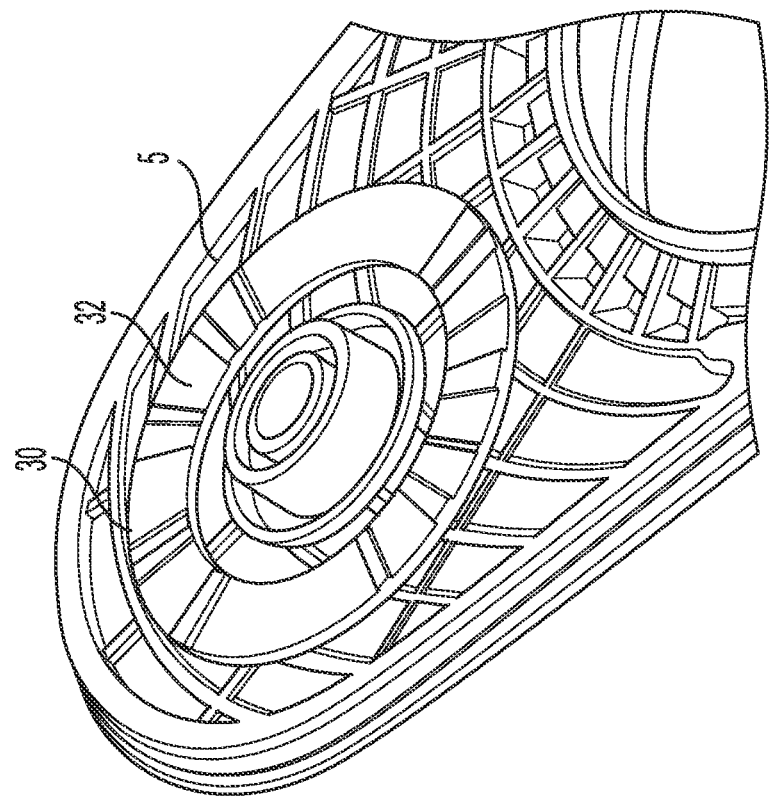
FIG. 3A is a perspective view of a front cover with an axial hydrodynamic bearing component.
Figure 3F:
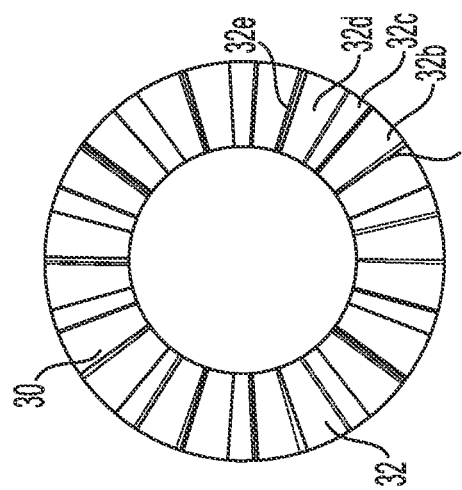
FIG. 3F is a front view of the axial hydrodynamic bearing component of FIGS. 3A-3E.
Figures 3D, 3E:
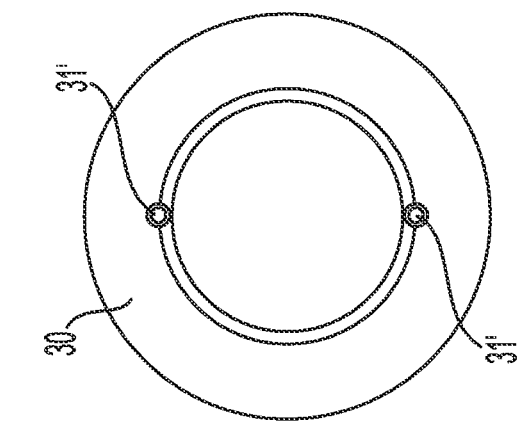
FIG. 3D is a rear view of the axial hydrodynamic bearing component of FIGS. 3A-3C.
FIG. 3E is a side cross-sectional view of the axial hydrodynamic bearing component of FIGS. 3A-3D.
Figure 3C:
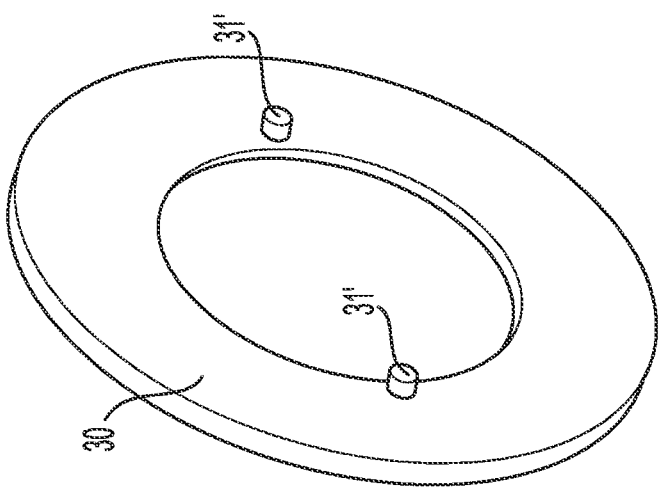
FIG. 3C is a view of the axial hydrodynamic bearing component of FIGS. 3A and 3B.

In one example, the second radially extending hydrodynamic bearing element 30 is configured to be fixed to the cover 5 via a connection, as shown at least in FIG. 3A. A connection between the second radially extending hydrodynamic bearing element 30 and the cover 5 can be provided via a protrusion 31 on the second radially extending hydrodynamic bearing element 30 mating with a receptacle 5a on the cover 5. In one example, there can be at least two protrusions 31 formed on the second radially extending hydrodynamic bearing element 30, and two receptacles 5a formed on the cover 5. One of ordinary skill in the art would understand that this connection between the second radially extending hydrodynamic bearing element 30 and the cover 5 can vary and could include various connection or fastening arrangements. In FIGS. 3C-3E, protrusions 31' for mating with the cover 5 are illustrated radially inward relative to the protrusions 31 in FIG. 2A to show one variation or example of different placement for the protrusions. One of ordinary skill in the art would understand that these protrusions 31, 31' can be formed on any area of the second radially extending hydrodynamic bearing element 30. In another example, the second radially extending hydrodynamic bearing element 130 can be formed integrally with a cover 105, as shown in FIG. 2B.

Spacing or clearances are generally provided between the three hydrodynamic bearing elements 20, 30, 40 and the gear 2 to allow for oil or hydraulic fluid to form a film which provides a bearing interface. A clearance (C1) can be configured to be provided between the first radially extending hydrodynamic bearing element 20 and the gear 2. In one example, the clearance (C1) can be 50 microns-100 microns. A clearance (C2) can be configured to be provided between the second radially extending hydrodynamic bearing element 30 and the gear 2. In one example, the clearance (C2) can be 50 microns-100 microns. A clearance (C3) can be configured to be provided between the axially extending hydrodynamic bearing element 40 and the gear 2. In one example, the clearance (C3) is 50 microns-150 microns.

The exact values for the clearances described above can vary, and the ratios between certain clearances can also vary. In one example, a first clearance (C1) is configured to be provided between the first radially extending hydrodynamic bearing element 20 and the gear 2, a second clearance (C2) is configured to be provided between the second radially extending hydrodynamic bearing element 30 and the gear 2, and a third clearance (C3) is configured to be provided between the axially extending hydrodynamic bearing element 40 and the gear 2. The first clearance (C1) and the second clearance (C2) can each be greater than the third clearance (C3). In another example, the first clearance (C1) and the second clearance (C2) can each be less than the third clearance (C3). The three clearances can each be within 25%-75% of one another, in one example. Various clearances and configurations can be provided, and this aspect can be dependent on the application requirements for rigidity.

The first radially extending hydrodynamic bearing element 20 can define a first axial bearing surface 22 configured to face the first axial side 2a of the gear 2, as shown in FIGS.

Figure 3G:
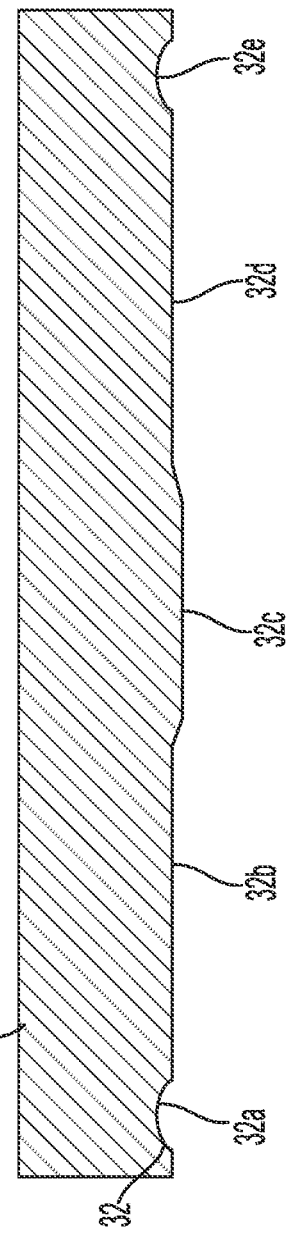
FIG. 3G is a cross-sectional view of the bearing surface of the axial hydrodynamic bearing component of FIGS. 3A-3F.
Figure 4B:
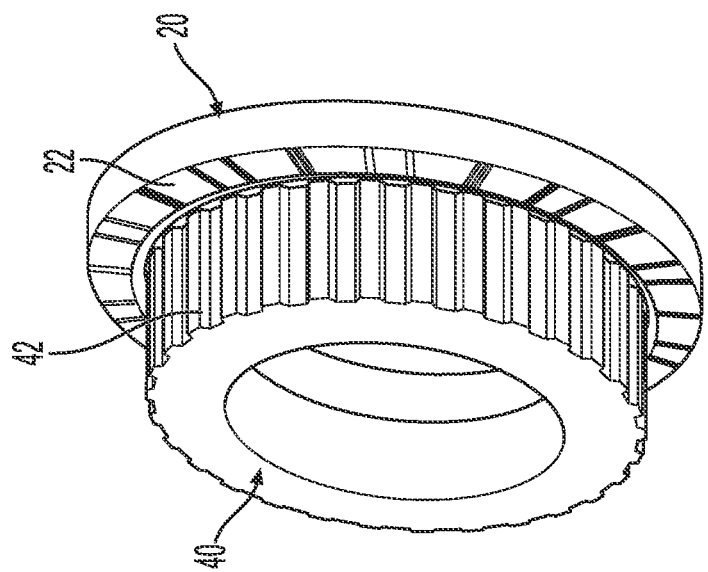
FIG. 4B is another perspective view of the hydrodynamic bearing component of FIG. 4A.
Figure 4A:
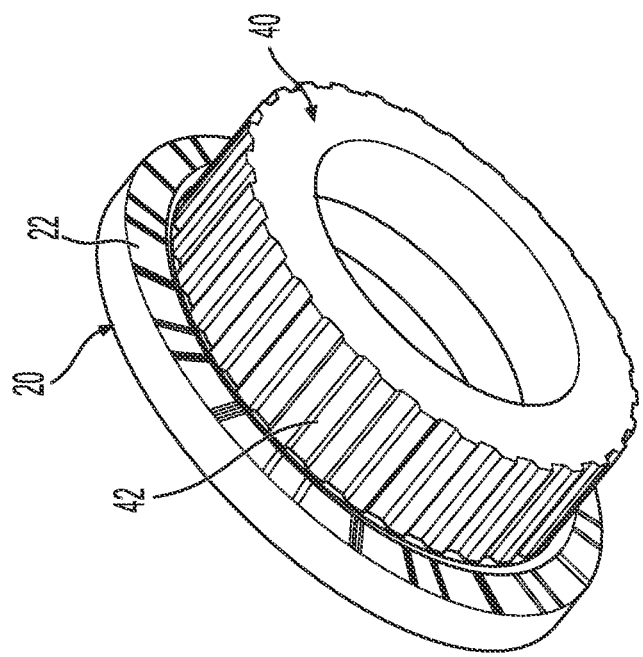
FIG. 4A is a perspective view of a hydrodynamic bearing component providing an axial and radial bearing interface.
Figure 4E:
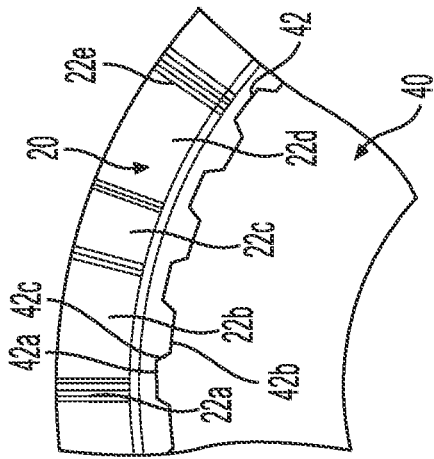
FIG. 4E is a magnified front view of the hydrodynamic bearing component of FIGS. 4A-4D.
Figure 4D:
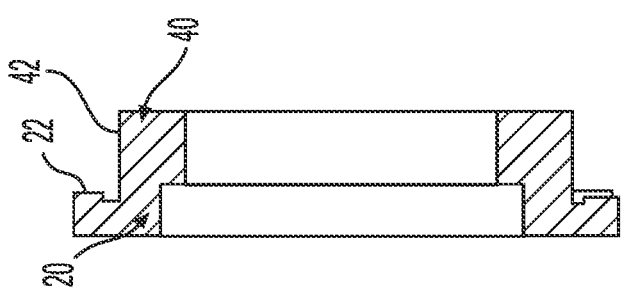
FIG. 4D is a cross-sectional view of the hydrodynamic bearing component of FIGS. 4A-4C.
Figure 4F:
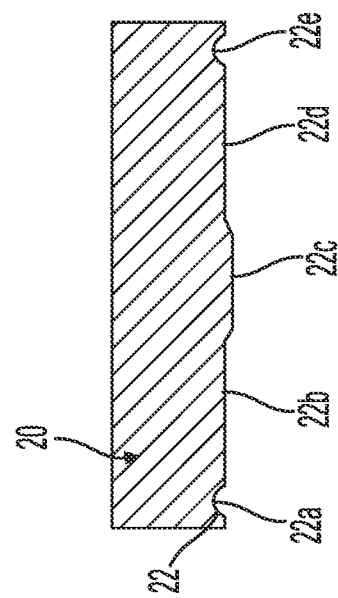
FIG. 4F is a cross-sectional view of the bearing surface of the hydrodynamic bearing component of FIGS. 4A-4E.
Figure 4C:
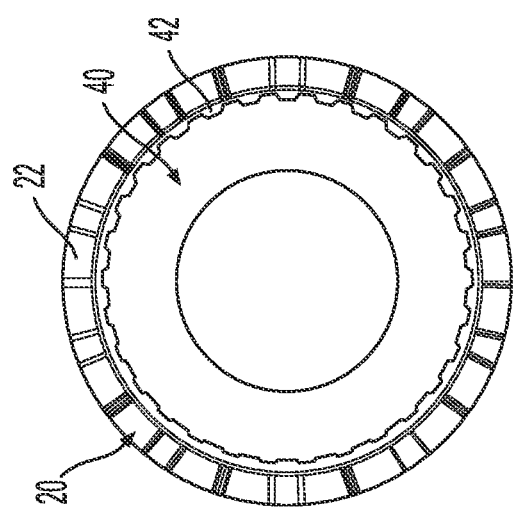
FIG. 4C is a front view of the hydrodynamic bearing component of FIGS. 4A and 4B.

4A and 4B. As shown in more detail in FIGS. 3A and 3B, the second radially extending hydrodynamic bearing element 30 can define a second axial bearing surface 32 configured to face the second axial side 2b of the gear 2. As shown in FIGS. 4A and 4B, the third axially extending hydrodynamic bearing element 40 can define a radial bearing surface 42 configured to face the radially inner side 2c of the gear 2. The first and second axial bearing surfaces 22, 32, and the radial bearing surface 42 can each include hydrodynamic bearing features. FIGS. 3C-3G illustrate further views of the second radially extending hydrodynamic bearing element 30 and FIGS. 4C-4F illustrate further views of the first radially extending hydrodynamic bearing element 20 and the third axially extending hydrodynamic bearing element 40.

Features (i.e., hydrodynamic bearing features, profiles, etc.) on these surfaces 22, 32, 42 can be configured to distribute an oil or fluid into a film in response to relative rotation. In one aspect, the film separates the surfaces so that friction is minimized. Both axial and radial forces may also be transmitted. Exemplary designs, features, bearing profiles, and other aspects of a hydrodynamic bearing are disclosed in U.S. Pat. No. 11,111,958 (issued on Sep. 7, 2021) and US Patent Pub. 2022/0048374 (published on Feb. 17, 2022), which are both incorporated by reference as if fully set forth herein, and are also owned by the present Applicant. In one example, the hydrodynamic bearing surfaces 22, 32, 42 can have a Raleigh step design which can be unidirectional or bi-directional depending on the operational requirements. In one example, each of the bearing surfaces 22, 32, 42 can include a flat section with ramped sections on either end of the flat section, and the profile can repeat around a circumference of the bearing surfaces 22, 32, 42. As shown in FIG. 3G, the hydrodynamic bearing surface 32 can include a first oil groove 32a, a first ramp 32b, a flat land section 32c, a second ramp 32d, and a second oil groove 32e. In one example, the radial bearing surface 42 defined by the axially extending hydrodynamic bearing element 40 can include a multi-layered surface for facing the gear 2. The radial bearing surface 42 can include a first section 42a and a second section 42b that are radially offset from each other with ramps or slanted surfaces 42c extending therebetween. The radial bearing surface 42 can alternatively have a similar profile as shown for bearing surfaces 22, 32. The patterns shown in FIGS. 3G, 4E, and 4F can repeat along a circumference of the respective components.

Figure 2C:
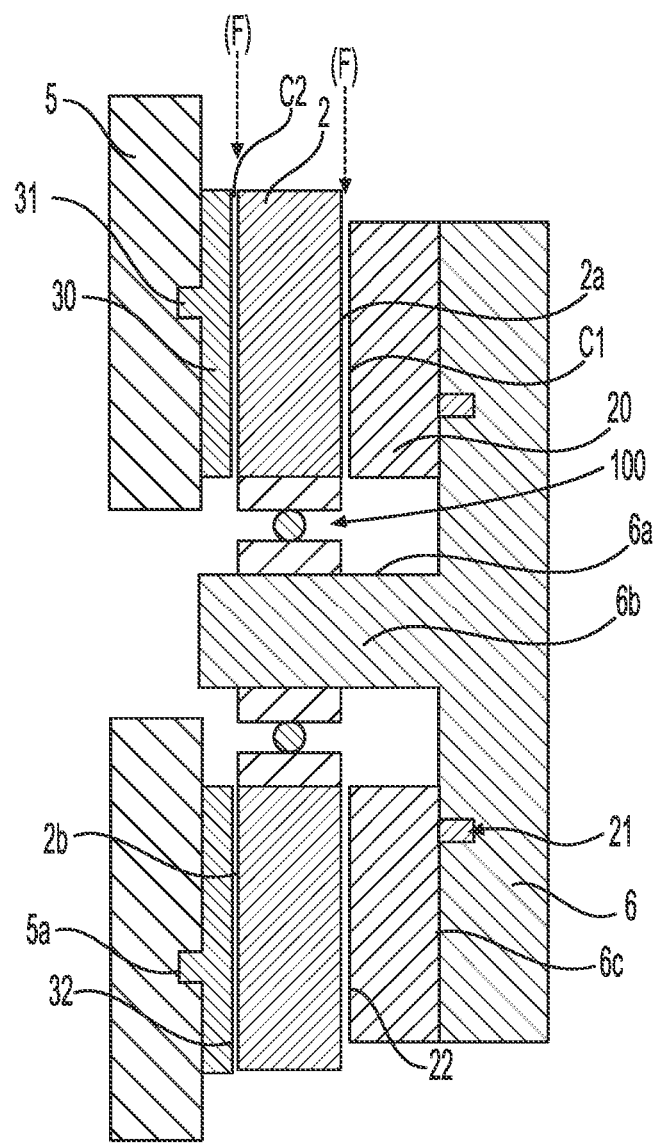
FIG. 2C is a cross-sectional schematic view of a hydrodynamic bearing assembly according to one embodiment.

As shown in FIG. 2C, in one configuration, a bearing assembly 100 can be provided radially inward from the gear 2. The bearing assembly 100 can be a ball bearing, in one example. All other aspects of supporting the axial sides of the gear 2 are the same as the configuration of FIG. 2A. The bearing assembly 100 can be supported radially inward on a portion of the axial portion 6b of the support 6. The hydrodynamic bearing element 20 can be supported with the support 6 via a post or protrusion 21 that is configured to be received within a receptacle of the support 6.

Based on the configuration disclosed herein, most of a surface area of both of the axial sides 2a, 2b of the gear 2 and the radially inner side 2c of the gear 2 is supported via a hydrodynamic bearing surface. In one example, the entirety of the surface area of these sides 2a, 2b, 2c can interface with a hydrodynamic bearing surface. In this manner, the gear 2 is fully supported and the hydrodynamic bearing elements 20, 30, 40 prevent titling and misalignment of the gear 2. Additionally, the present configuration provides a less complex design as compared to a deep groove ball bearing.

Having thus described the present disclosure in detail, it is to be appreciated and will be apparent to those skilled in the art that many physical changes, only a few of which are exemplified in the detailed description of the invention, could be made without altering the inventive concepts and principles embodied therein.

It is also to be appreciated that numerous embodiments incorporating only part of the preferred embodiment are possible which do not alter, with respect to those parts, the inventive concepts and principles embodied therein.

The present embodiment and optional configurations are therefore to be considered in all respects as exemplary and/or illustrative and not restrictive, the scope of the embodiments being indicated by the appended claims rather than by the foregoing description, and all alternate embodiments and changes to this embodiment which come within the meaning and range of equivalency of said claims are therefore to be embraced therein.

LOG OF REFERENCE NUMERALS

Gear 2
First axial side 2a of the gear
Second axial side 2b of the gear
Radially inner side 2c of the gear
Cover 5, 105
Support 6
Radially outer 6a surface of the support
Axial portion 6b of the support
Radial portion 6c of the support
First radially extending hydrodynamic bearing element 20
Protrusion 21
First axial bearing surface 22
First oil groove 22a
First ramp 22b
Flat land section 22c
Second ramp 22d
Second oil groove 22e
Second radially extending hydrodynamic bearing element 30, 130
Protrusions 31, 31'
Second axial bearing surface 32
First oil groove 32a
First ramp 32b
Flat land section 32c
Second ramp 32d
Second oil groove 32e
Axially extending hydrodynamic bearing element 40
Radial bearing surface 42
First section 42a
Second section 42b
Slanted surface 42c
Bearing assembly 100
Transmission assembly 101
Gear 102
Drive gear 103
Driven gear 104
Cover 105
Support 106
Support bearing 107

What is claimed is:

1. A bearing configuration for an oil pump assembly, the bearing configuration comprising:
a first radially extending hydrodynamic bearing element configured to directly face a first axial side of a gear;

a second radially extending hydrodynamic bearing element configured to directly face a second axial side of the gear; and an axially extending hydrodynamic bearing element configured to directly face a radially inner side of the gear;

wherein the second radially extending hydrodynamic bearing element is formed integrally with a cover; and wherein the first radially extending hydrodynamic bearing element and the axially extending hydrodynamic bearing element are formed integrally with each other.

2. The bearing configuration according to claim 1, wherein the first radially extending hydrodynamic bearing element is configured to be fixed to a support.

3. The bearing configuration according to claim 1, wherein the axially extending hydrodynamic bearing element is configured to be press fit onto a radially outer surface of a support.

4. The bearing configuration according to claim 1, wherein a clearance (C1) is configured to be provided between the first radially extending hydrodynamic bearing element and the gear, and the clearance (C1) is 50 microns-100 microns.

5. The bearing configuration according to claim 1, wherein a clearance (C2) is configured to be provided between the second radially extending hydrodynamic bearing element and the gear, and the clearance (C2) is 50 microns-100 microns.

6. The bearing configuration according to claim 1, wherein a clearance (C3) is configured to be provided between the axially extending hydrodynamic bearing element and the gear, and the clearance (C3) is 50 microns-150 microns.

7. The bearing configuration according to claim 1, wherein a first clearance (C1) is configured to be provided between the first radially extending hydrodynamic bearing element and the gear, a second clearance (C2) is configured to be provided between the second radially extending hydrodynamic bearing element and the gear, and a third clearance (C3) is configured to be provided between the axially extending hydrodynamic bearing element and the gear.

8. The bearing configuration according to claim 1, wherein the first radially extending hydrodynamic bearing element defines a first axial bearing surface configured to face a first axial side of the gear, the first axial bearing surface including a plurality of flat land sections and ramped sections.

9. The bearing configuration according to claim 1, wherein the second radially extending hydrodynamic bearing element defines a second axial bearing surface configured to face a second axial side of the gear, the second axial bearing surface including a plurality of flat land sections and ramped sections.

10. The bearing configuration according to claim 1, wherein the axially extending hydrodynamic bearing element defines a radial bearing surface configured to face a radially inner surface of the gear, the radial bearing surface including a first section and a second section that are radially offset from each other with a slanted surface extending therebetween.

* * * * *